United States Patent Office 3,432,554
Patented Mar. 11, 1969

3,432,554
2,2-BIS(DIFLUOROAMINO)-ALKANES BY REACTING ALIPHATIC KETONE WITH DIFLUORAMINE AND BF₃
John Peters, Saltcoats, and James Grigor, Coatbridge, Scotland, assignors, by mesne assignments, to the United States of America as represented by the Secretary of the Navy
No Drawing. Filed Nov. 6, 1962, Ser. No. 235,885
Claims priority, application Great Britain, Nov. 8, 1961, 40,085/61; Nov. 30, 1961, 42,969/61, 42,970/61
U.S. Cl. 260—583                                     10 Claims
Int. Cl. C07c 87/22, 85/08

The present invention relates to difluoramino derivatives of ketones and their production. Said derivatives have the general formula

wherein R is selected from the group consisting of methyl and ethyl group and R' is an alkyl group containing not more than 4 carbon atoms.

These compounds find utility as propellant explosive ingredients and possess very high energy contents. It has been proposed to convert ketones such, for example, as acetone, methylethyl ketone, cyclohexanone, or cyclopentanone, to corresponding gem-bis(difluoramino)-compounds by refluxing with difluoramine ($NF_2H$) in the presence of 96% sulphuric acid.

The elimination of sulphuric acid from the products presents difficulties, and it was thought that a Friedel-Crafts reagent might be substituted for the sulphuric acid in order that it could be more easily removed from the reaction products. A range of Friedel-Crafts reagents including $AlCl_3$, $AlBr_3$, $FeCl_3$, $SnCl_4$, $SnCl_2$, $BCl_3$ and $BBr_3$ was investigated but none was found to act satisfactorily. It was found that boron trifluoride was the only successful reagent of all the range investigated.

According to the present invention an acyclic aliphatic ketone having a formula RR'CO where R is methyl or ethyl and R' is an alkyl group containing not more than 4 carbon atoms is reacted with boron trifluoride and difluoramine.

In the case of acetone, the boron trifluoride can be reacted first with the acetone to give an addition compound which may be reacted with difluoramine. In the case of the remaining ketones of the defined group, however, boron trifluoride merely reacts to give useless tarry masses and it is necessary to perform the reaction through an intermediate stage by first reacting the ketone with difluoramine alone to give a hydroxy-difluoramino derivative of the ketone which may then be reacted with boron trifluoride and difluoramine to give a bis(difluoramino) derivative of the ketone. Acetone, of course, also undergoes the reaction in this manner.

According to one particular aspect of the present invention, a process for the preparation of the bis-(difluoramino)-derivative of acetone comprises the steps of reacting acetone with boron trifluoride in equimolar proportions to produce an addition compound and of refluxing the resulting addition compound with a quantity of dry difluoramine exceeding twice the molar proportion.

The addition compound reacts with twice the molar proportion of difluoramine but the reaction is carried out in the presence of excess difluoramine which is removed at the end of the process.

The first step of the reaction is preferably carried out by bubbling boron trifluoride through the acetone.

According to a further aspect of the present invention, process for the preparation of the bis(difluoramino) derivative of an acyclic aliphatic ketone having a formula RR'CO where R is methyl or ethyl and R' is an alkyl group containing not more than 4 carbon atoms comprises the steps of reacting the ketone with difluoramine to produce the hydroxy-difluoramine derivative of the ketone, reacting said hydroxy-difluoramino derivative of the ketone with boron trifluoride in equimolar proportions to produce an addition compound, and of refluxing the resulting addition compound with a quantity of dry difluoramine present in at least equimolar proportions.

The final step of the process of refluxing with difluoramine requires equimolar proportions, but the reaction is preferably carried out in the presence of excess difluoramine which is removed at the end of the process.

It has been suggested that acetone reacts with difluoramine to give the hydroxy-difluoramino derivative of acetone but it has now been found that, in fact, an equilibrium mixture of acetone, difluoramine and the hydroxy-difluoramino derivative of acetone is produced. Removal of difluoramine shifts the equilibrium back towards difluoramine and acetone and the method does not permit the isolation of a pure sample of the hydroxydifluoramino derivative of acetone.

Our investigations reveal that the reaction with acetone gives a hydroxy-difluoramino derivative in solution which may then be reacted with diffuoramine and boron trifluoride to give the bis(difluoramino) derivative of acetone. In the case of the other ketones in the group the hydroxy-difluoramino derivatives can be isolated and can also, of course, be further reacted to give the bis(difluoramino) derivatives.

Example 1

2.3 g. (0.04 mole) of pure dry acetone was cooled to 0° C. and boron trifluoride gas slowly bubbled into it until the mixture solidified to a pale yellow crystalline mass which was an addition compound having the approximate composition $(CH_3)_2CO \cdot BF_3$. Approximately 4.7 g. (0.09 mole) of dried difluoramine was condensed onto the solid by means of a cold-finger condenser cooled to −80° C. with a mixture of acetone and solid carbon dioxide ("Drikold"—R.T.M.). The difluoramine was allowed to reflux from the mixture for four hours during which time the solid dissolved. At the end of this time the excess difluoramine was allowed to evaporate from the mixture and the liquid layers formed. The upper layer was separated, successively washed with three 1 cc. portions of water and then dried over anhydrous sodium sulphate. The product (B.P. 71° C.) was identified by elemental analysis and infra-red spectrogram as 2,2-bis-(difluoramino)-propane and the yield was 1.73 g. (0.012 mole). Analysis gave C, 24.9; H, 4.8; N, 18.6; F, 51.0%. $C_3H_6N_2F_4$ requires C, 24.7; H, 4.1; N, 19.2; F, 52.0%.

Infra-red analysis showed characteristic absorption at 6.8, 7.2, 8.2, 9.8, 10.6 10.9 and 11.2.

The same method of introducing difluoramine was used when preparing hydroxy-difluoramino derivatives of the ketones.

Difluoramine gas was led into a "cold finger" condenser cooled with a solid carbon dioxide/acetone mixture and the liquefied difluoramine refluxed on to the ketone or to a solution or suspension of the ketone. The reaction solution was stirred by a slow stream of nitrogen. After up to 4 hours' reflux the excess difluoramine was allowed to evaporate off. The product remaining was the hydroxy-difluoramino derivative of the ketone, either pure or in solution.

Example 2

Methyl ethyl ketone (2.50 g.) was treated as above with difluoramine (9.0 g.). The reaction product, 2,hydroxy-2,difluoraminobutane (4.28 g.) was a colourless liquid.

The product showed characteristic absorption at 2.85, 10.25, 10.45 and 11.4μ in the infrared region.

Analysis gave: C, 38.5; H, 7.1; N, 8.6; F, 30.1%. $C_3H_9F_2NO$ requires: C, 38.4; H, 7.2; N, 11.2; F, 30.4%.

Example 3

Acetylacetone (0.98 g.) was treated with difluoramine (9.0 g.) as above. The product was 2,4-dihydroxy-2,4-bis(difluoramino) pentane (1.86 g.) which showed characteristic absorption at 2.9, 10.2 and 11.3μ in the infrared region.

Example 4

Biacetyl (1.24 g.) was treated with difluoramine (4.5 g.) as above. The product was 2,3-dihydroxy-2,3-bis(difluoramino)butane (1.94 g.) which showed characteristic absorption at 2.9, 10.15 and 11.35μ in the infrared region.

Example 5

2,hydroxy-2,difluoraminopropane was prepared by reacting 1.23 g. acetone with 4.5 g. difluoramine. Using the procedure described in Example 1, the resulting 2,hydroxy-2,difluoraminopropane was first saturated with boron trifluoride and then allowed to react with 4.5 g. difluoramine under reflux conditions. After washing and drying a yield of 1.36 g. of 2,2-bis(difluoramino)propane was obtained. (B.P. 71° C.)

Example 6

2.10 g. 2,hydroxy-2,difluoraminobutane was cooled in an ice water bath and gaseous boron trifluoride bubbled into the liquid until fully saturated. Gaseous difluoramine (9.0 g.) was condensed by means of a "cold finger" condenser at —80° C. and the resulting liquid difluoramine allowed to drop on to the saturated solution of boron trifluoride in 2,hydroxy - 2,difluoraminobutane. The difluoramine was allowed to reflux for four hours and the excess of difluoramine then allowed to evaporate in a slow stream of nitrogen. The residual liquor separated into two layers, the upper one being 2,2-bis(difluoramino) butane which was purified by washing with a little cold water and dried over anhydrous sodium sulphate. Yield— 1.62 g.

Example 7

2,hydroxy-2,difluoraminopentane as prepared by reacting 1.5 g. methyl n-propyl ketone with 4.5 g. difluoramine. Using the procedure described in Example 6, the resulting compound was saturated with boron trifluoride and then allowed to react with 4.5 g. difluoramine under reflux conditions. After washing and drying a yield of 1.32 g. of 2,2 bis(difluoramino)pentane was obtained.

Example 8

2,hydroxy-2,difluoramino - 3,methylpentane was prepared by reacting 1.5 g. methyl iso-butyl ketone with 4.5 g. difluoramine. Using the procedure described in Example 6, the resulting compound was saturated with boron trifluoride and then allowed to react with 4.5 g. difluoramine under reflux conditions. After washing and drying, a yield of 0.82 g. of 2,2 bis(difluoramino) - 3,methyl-pentane was obtained.

Difluoramino derivatives of ketones prepared in accordance with the present invention are useful high-energy propellant explosive ingredients. They can be induced to explode and, when ignited, burn extremely rapidly with a fierce flame.

We claim:

1. Process for the preparation of bis difluoramino compounds comprising reacting an acyclic aliphatic ketone having a formula RR'CO with boron trifluoride and difluoramine, wherein R is selected from the group consisting of methyl and ethyl groups and R' is an alkyl group containing not more than 4 carbon atoms.

2. Process according to claim 1 wherein the ketone is first reacted with difluoramine and the resulting reaction product then reacted with boron trifluoride and additional difluoramine.

3. Process according to claim 1 wherein the ketone is acetone which is first reacted with boron trifluoride and the resulting product is then reacted with difluoramine.

4. Process for the preparation of a bis difluoramino compound comprising reacting acetone with boron trifluoride in equimolar proportion and refluxing the resulting reaction product with a quantity of dry difluoramine exceeding twice the molar proportion.

5. Process for the preparation of a bis difluoramino compound comprising reacting an acyclic aliphatic ketone having a formula RR'CO wherein R is selected from the group consisting of methyl and ethyl groups and R' is an alkyl group containing not more than 4 carbon atoms, with difluoramine, reacting the resulting reaction product with boron trifluoride in equimolar proportions to produce an addition compound, and refluxing the resulting addition compound with a quantity of dry difluoramine present in at least equimolar proportions.

6. A compound having the general formula:

wherein R is selected from the group consisting of methyl and ethyl groups and R' is an alkyl group containing not more than 4 carbon atoms.

7. 2,2-bis-(difluoramino)-propane.
8. 2,2-bis(difluoramino)butane.
9. 2,2-bis(difluoramino)pentane.
10. 2,2-bis(difluoramino)-3,methyl-pentane.

References Cited

Hoffman et al. Chem. Reviews, vol. 62, pp. 12 to 18 (1962).

LELAND A. SEBASTIAN, Primary Examiner.

U.S. Cl. X.R.

149—109; 260—584

Disclaimer 3,432,554.—*John Peters*, Saltcoats, and *James Grigor*, Coatbridge, Scotland, 2,2-BIS(DIFLUOROAMINO)-ALKANES BY REACTING ALIPHATIC KETONE WITH DIFLUORAMINE AND $BF_3$. Patent dated Mar. 11, 1969. Disclaimer filed Jan. 19, 1971, by the assignee, *United States of America as represented by the Secretary of the Navy*.

Hereby enters this disclaimer to claims 6 to 10 of said patent.

[*Official Gazette April 20, 1971.*]